United States Patent
Sjogren et al.

(10) Patent No.: US 8,366,315 B2
(45) Date of Patent: Feb. 5, 2013

(54) OPEN-LOOP VERTICAL DRYWELL GRADIENT CORRECTION SYSTEM AND METHOD

(75) Inventors: Allen Erik Sjogren, Park City, UT (US); Eric Nerdrum, Kaysville, UT (US)

(73) Assignee: Fluke Corporation, Everett, WA (US)

(*) Notice: Subject to any disclaimer, the term of this patent is extended or adjusted under 35 U.S.C. 154(b) by 0 days.

(21) Appl. No.: 13/049,716

(22) Filed: Mar. 16, 2011

(65) Prior Publication Data

US 2011/0164651 A1    Jul. 7, 2011

Related U.S. Application Data

(62) Division of application No. 11/940,244, filed on Nov. 14, 2007, now Pat. No. 7,909,504.

(51) Int. Cl.
*G01K 15/00*    (2006.01)
(52) U.S. Cl. .................................... 374/1; 374/208
(58) Field of Classification Search .................. 374/1–3, 374/120, 121, 129, 208, 163, 100, 109, 134, 374/137, 145, 166, 29–30, 32; 702/99
See application file for complete search history.

(56) References Cited

U.S. PATENT DOCUMENTS

| | | | |
|---|---|---|---|
| 3,939,687 A | 2/1976 | Waldron | 374/1 |
| 4,079,618 A | 3/1978 | King | 374/1 |
| 4,901,257 A * | 2/1990 | Chang et al. | 702/99 |
| 6,170,983 B1 | 1/2001 | Germanow et al. | 374/1 |
| 6,193,411 B1 * | 2/2001 | Chen | 374/2 |
| 6,663,277 B1 * | 12/2003 | Sandmæ.l | 374/3 |
| 7,561,058 B2 | 7/2009 | Farley et al. | 340/635 |
| 7,607,309 B2 * | 10/2009 | Liebmann et al. | 62/3.3 |
| 7,669,427 B2 | 3/2010 | Walker et al. | 62/3.7 |
| 7,785,000 B2 * | 8/2010 | James et al. | 374/1 |
| 7,909,504 B2 * | 3/2011 | Sjogren et al. | 374/1 |
| 8,117,848 B2 * | 2/2012 | Liebmann et al. | 62/3.3 |
| 2007/0206653 A1 * | 9/2007 | Nakano et al. | 374/1 |
| 2007/0291814 A1 * | 12/2007 | Hirst | 374/1 |
| 2010/0103975 A1 * | 4/2010 | Harslund et al. | 374/1 |

* cited by examiner

*Primary Examiner* — Gail Verbitsky
(74) *Attorney, Agent, or Firm* — Christensen O'Connor Johnson Kindness PLLC

(57) ABSTRACT

A system and method are disclosed for controlling a drywell including a receiver having upper and lower ends with the lower end being more insulated than the upper and having a temperature sensor in thermal contact therewith. Upper and lower heaters are in thermal contact with the upper and lower ends respectively. A controller includes an integrated circuit having a temperature sensor. A reading from the integrated circuit is used to control power to the upper heater and reduce a temperature gradient between the upper and lower ends of the receiver.

6 Claims, 5 Drawing Sheets

OPEN-LOOP VERTICAL DRYWELL GRADIENT CORRECTION SYSTEM AND METHOD

CROSS-REFERENCE TO RELATED APPLICATION

This application is a divisional of U.S. patent application Ser. No. 11/940,244, filed Nov. 14, 2007. This application is incorporated by reference herein in its entirety and for all purposes.

TECHNICAL FIELD

This invention relates to systems and methods for controlling drywell temperature.

BACKGROUND OF THE INVENTION

It is typical for thermometers and thermal switches to be calibrated using a drywell. Drywells may include a receiver in which a thermometer or thermal switch is inserted. A heating element and temperature sensor are in thermal contact with the receiver such that the temperature within the receiver may be accurately set. The set temperature of the drywell may then be compared to the readout temperature of the thermometer or the switching temperature of a thermal switch to determine its accuracy. In some uses, a reference thermometer is inserted within the receiver along with the thermometer or switch being calibrated, and the readout of the reference thermometer is used for calibration purposes.

It is important in some applications to provide a uniform temperature gradient between the top and the bottom of the receiver such that the temperature actually imposed on the probe is very close to the set temperature of the drywell or the readout temperature of the reference thermometer. In prior systems, two heating elements are used, one near the top of the receiver and another near the bottom. Two temperature sensors also located near the top and the bottom of the receiver provide feedback. A controller receives signals from the temperature sensors and drives the heaters such that the temperature sensors indicate the same temperature.

The above described approach is costly inasmuch as it requires two thermal sensors. The sensors used must be of extremely high quality and sensitivity inasmuch as they are used for calibration of thermometers and thermal switches that are themselves highly accurate. The sensors may need to be accurate over a broad range—from about 20 to over 600 degrees Celsius. Due to the large temperature changes to which the sensors are subject and the need for accuracy, each of the sensors may need to be serviced or replaced during the life of the drywell. The additional sensor further increases expense by requiring additional circuitry and processing power to provide feedback control using the output of the sensor.

In view of the foregoing it would be an advancement in the art to provide a drywell using a single receiver mounted thermal sensor without increasing the cost or processing requirements of the drywell.

SUMMARY OF THE INVENTION

In one aspect of the invention a drywell includes a receiver into which the probe of a thermometer or thermal switch may be inserted. The receiver has upper and lower ends, with the upper end being exposed to ambient air and the lower end being substantially more insulated than the upper end. An upper heating element is in thermal contact with the upper end and a lower heating element is in thermal contact with the lower end. A temperature sensor is also in thermal contact with the lower end. The only temperature sensors providing an output regarding the temperature of the receiver are positioned within the insulated lower end. In an alternative embodiment, the only temperature sensor is located proximate the upper end.

A controller is coupled to the heating elements and the temperature sensor to control the temperature of the receiver. The controller may include a printed circuit board having an ambient temperature sensor mounted thereon. The ambient sensor may be embedded within an integrated circuit mounted to the printed circuit board. In one embodiment, the integrated circuit is a dual mode circuit having operational and sensing modes. The controller may switch the integrated circuit into the sensing mode in order to measure the ambient temperature.

The controller is programmed to monitor the receiver temperature, compare the receiver temperature to a set temperature, and to calculate a lower heater power value effective to drive the receiver temperature toward the set temperate. The controller also calculates an upper heater power value according to the ambient temperature reading and at least one of the set temperature and the receiver temperature. The upper heater value is effective to drive the temperature of the upper end of the receiver toward the set temperature and compensate for heat loss to the ambient from the upper end. The controller then supplies the upper heater value and the lower heater value to the upper and lower heaters, respectively.

DETAILED DESCRIPTION OF PREFERRED EMBODIMENTS

Figure 1:
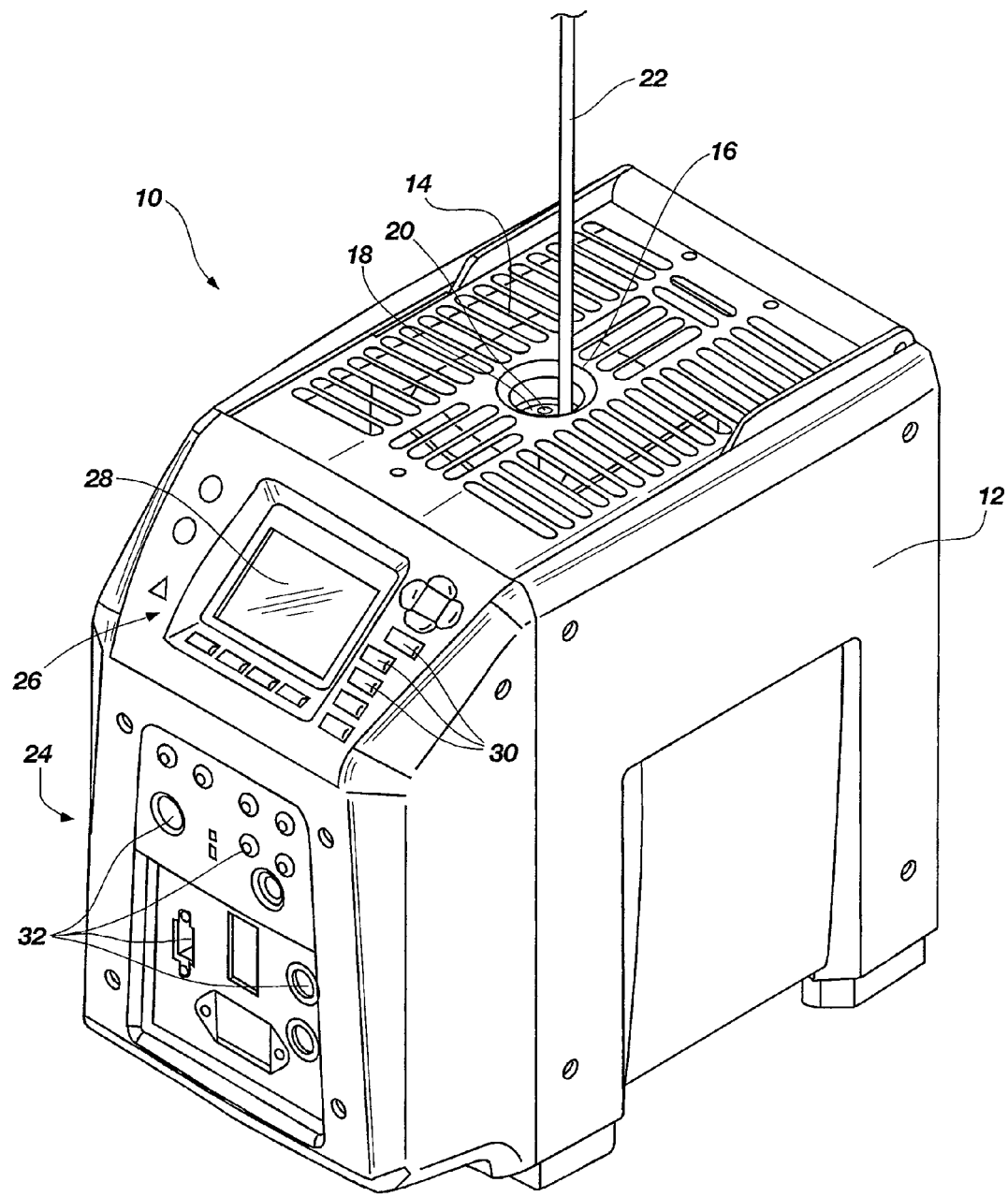
FIG. 1 is an isometric view of a drywell in accordance with an embodiment of the invention.

Referring to FIG. 1, a drywell 10 may include a housing 12. A vent plate 14 may be secured near the top of the housing 12 and permit air to flow out of the drywell 10. The vent plate 14 defines an aperture 16 positioned over a receiver 18. The receiver 18 includes one or more apertures 20 sized to receive the probe 22 of a thermometer, thermal switch, or the like. In use, the temperature of the receiver 18 is elevated to a specified temperature in order to test the thermal response characteristics and accuracy of the device being tested. A heating element in thermal contact with the receiver 18 may be used to control the temperature of the receiver 18.

The drywell 10 may include a control module 24 secured thereto. Alternatively, the control module 24 is remote from the drywell 10 and coupled to the drywell 10 by wires or other communication means. The control module 24 may include an interface 26 for interacting with the drywell 10. The interface 26 may include a display 28, input buttons 30, and ports 32 for coupling thermometers, thermal switches, and the like to the control module 24 for testing.

Figure 2:
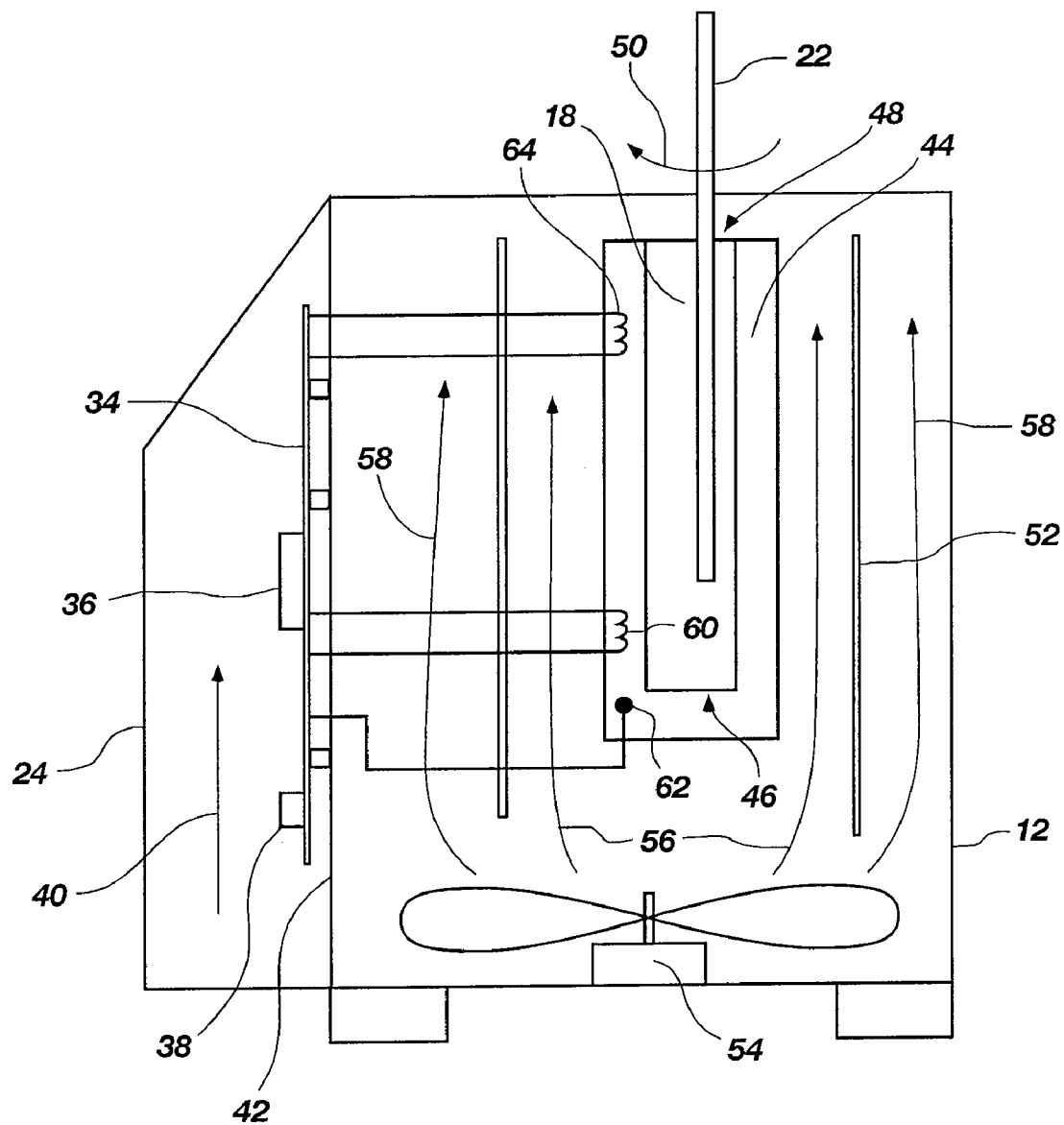
FIG. 2 is a side cross sectional view of a drywell in accordance with an embodiment of the present invention.

Referring to FIG. 2, the drywell 10 may include a circuit board 34 mounted within the control module 24. The circuit board 34 may include a processor 36 for executing executable data and processing operational data. In some embodiments, other integrated circuits 38 mount to the circuit board 34 and are in data communication with the processor 36. In the illustrated embodiment, one of the integrated circuits 38 is a dual mode analog to digital (A/D) converter, having operational and temperature sensing modes.

The circuit board 34 may be exposed to ambient air flow 40, whether active or passive. For example, a fan may supply air to the circuit board 34. Alternatively, the control module 24 may be supplied with vents permitting convective air flow therethrough. The circuit board 34 may be separated from the receiver 18 by a wall 42. The wall 42 may be formed of metal, plastic, or other material. The wall 42 may include insulation thermally isolating the circuit board 34 from the receiver 18.

The receiver 18 may include insulation 44 surrounding a lower end 46 thereof. The insulation 44 may extend up to the upper end 48, but leaving the upper end 48 exposed in order to permit insertion of the probe 22. Accordingly, the upper end 48 is subject to heat loss to ambient air flow 50 to a much greater extent than the lower end 46.

A shield 52 may extend between the lower end 46 and the upper end 48 of the receiver 18. A fan 54 positioned below the receiver 18 may direct airflow 56 between the insulation 44 and the shield 52. The fan 54 may also induce airflow 58 between the shield 52 and the housing 12.

As is apparent from FIG. 2, the circuit board 34 is thermally isolated from the receiver 18 by means of the active cooling induced by the fan 54, the shield 52, and the wall 42. Thermal isolation may advantageously reduce heat related variation in the functioning of the circuit board and prevent damage.

A lower heating element 60 is secured in thermal contact with the receiver 18 proximate the lower end 46. A temperature sensor 62, such as thermocouple or like sensor, may also be positioned in thermal contact with the receiver 18 proximate the lower end 46. An upper heating element 64 may be secured in thermal contact with the receiver 18 proximate the upper end 48.

The upper and lower heating elements 60, 64 may be controlled by the circuit board 34. In some embodiments, intervening current handling circuits may be positioned electrically between the heating elements 60, 64 and the circuit board 34 to supply actual current to the heating elements 60, 64 subject to control signals from the circuit board 34.

Figure 3:
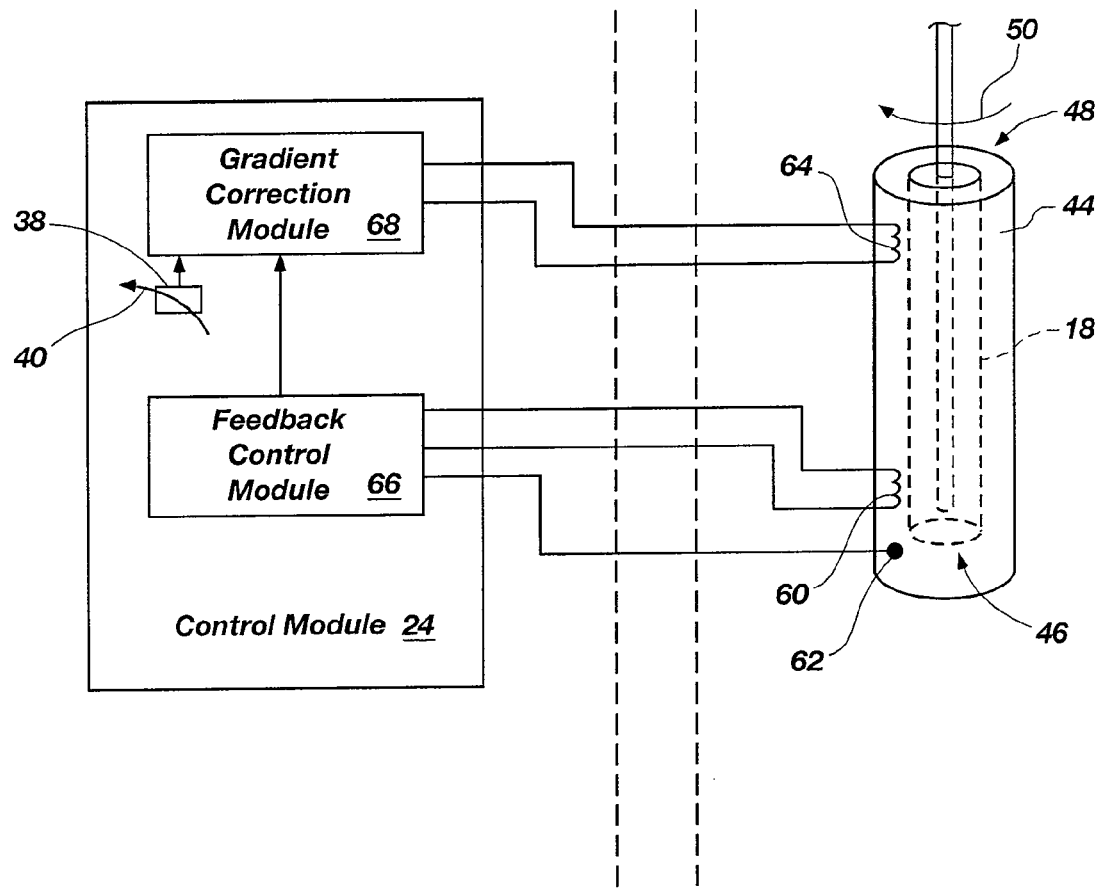
FIG. 3 is a schematic block diagram of a drywell in accordance with an embodiment of the present invention.

Referring to FIG. 3, the control module 24 may include a feedback control module 66 in electrical communication with the temperature sensor 62 and the lower heating element 60. The feedback control module 66 may compare a reading from the temperature sensor 62 to a set temperature. The feedback control module 66 then determines an amount of power to supply to the lower heating element 60 in order to reach the set temperature.

The feedback control module 66 may communicate with a gradient correction module 68. The gradient correction module 68 determines from a measurement of ambient temperature a correction factor compensating for heat loss to the ambient. In the illustrated embodiment, the gradient control module 68 receives an input from the feedback control module 66, such as a signal corresponding to one or more of the current amount of power being supplied to the lower heating element 60, the current set temperature, the current output of the temperature sensor, or some value derived from all or some of these factors. The feedback control circuit also receives a temperature measurement from the integrated circuit 38 mounted to the circuit board 34. The gradient correction module 68 then calculates one or more correction factors based on the measurement from the integrated circuit 38 and the values received from the feedback control module 66.

In one embodiment, the gradient correction module 68 receives a value corresponding to the amount of power being supplied to the lower heating element 60 and either the set temperature or measured temperature. The gradient correction module 68 may then add a correction factor to the amount of power being supplied to the lower heating element 60, multiply it by a correction factor, or both to determine a corrected power value. The gradient correction module 68 then drives the upper heating element 64 according to the corrected power value. In some embodiments, the temperature measurement of the integrated circuit 38 is supplied to the feedback control module 66 in order to determine the amount of power to supply to the lower heating element 60.

The feedback control module 66 and gradient correction module 68 may be implemented as digital or analog circuits or as code executed by a processor or by some other means. The components performing the function corresponding to these modules 66, 68 may be in the same or different physical or logical locations. The functions attributed the modules 66, 68 may be performed by the same component simultaneously or non-simultaneously.

Figure 4:
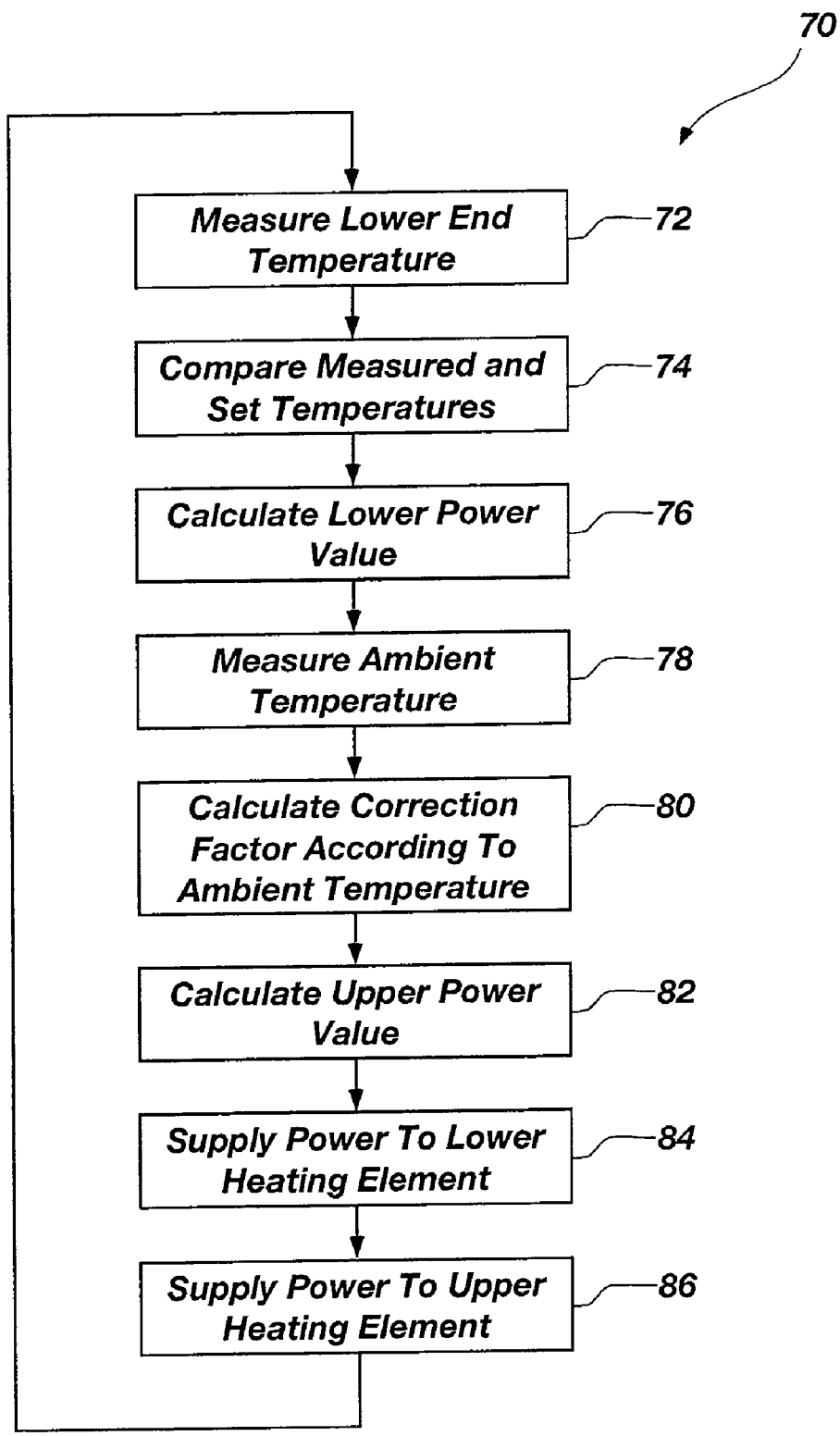
FIG. 4 is a process flow diagram of an open loop vertical gradient correction method in accordance with an embodiment of the present invention.

Referring to FIG. 4, a method 70 for controlling a drywell 10 may include measuring the temperature of the receiver 18 proximate the lower end 46 at block 72. Block 72 may include measuring the temperature of a body in thermal contact with the receiver 18. At block 74 a set temperature and the temperature measured at block 72 are compared. At block 76 the amount of power to be supplied to the lower heater 60 is calculated based on the comparison at block 74. The power may be calculated as a voltage, current, or a unit of energy such as watts. The amount of power to be supplied may correspond to the difference between the measured and set temperatures according to known principles of control dynamics.

At block 78, the ambient temperature is measured. At block 80, one or more correction factors are calculated. The correction factors may be used to calculate the power to the upper heater 64. For example, the correction factors may be multiplied by, or added, to or otherwise combined with the power value calculated at block 76 for the lower heater 60 such that the temperature gradient between the upper end 48 and lower end 46 due to heat loss to the ambient will be reduced.

At block 82, the amount of power to be supplied to the upper heater 64 is calculated. Block 82 may include combining the correction factor with the value calculated at block 76 or by calculating a power value according to the temperature measured at block 78 and one or both of the set temperature and the temperature measured by the temperature sensor 62. The upper power value is preferably effective to substantially reduce the temperature gradient between the upper and lower ends 48, 46 caused by heat loss to the ambient.

At block 84, the power value calculated at block 76 is supplied to the lower heater 60 and at block 86, the power value calculated at block 82 is supplied to the upper heater 64. The method 70 may repeat periodically or substantially continuously.

Figure 5:
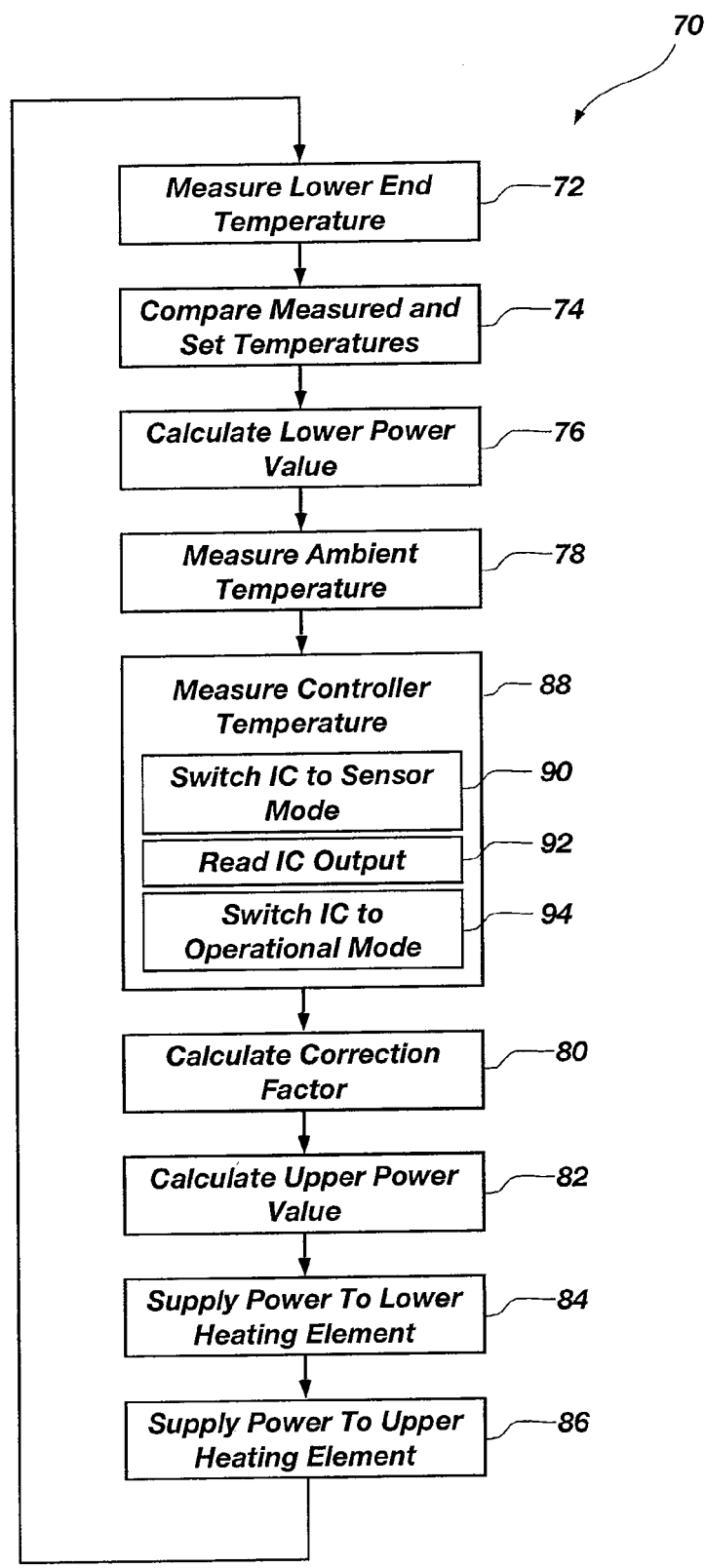
FIG. 5 is a process flow diagram of an alternative embodiment of an open loop vertical gradient correction method in accordance with an embodiment of the present invention.

Referring to FIG. 5, in an alternative embodiment, the step of measuring ambient temperature at block 78 may be replaced by the illustrated steps. At block 88, the temperature of the controller is measured. This may include measuring the temperature of the circuit board 34 comprising the control module 24, for example, the integrated circuit 38 may include a temperature sensor providing a reading of the temperature of the integrated circuit 38. Inasmuch as the circuit board 34 is exposed to the ambient airflow 40, the temperature of the circuit board 34 and the integrated circuit 38 at steady state will be reflective of the ambient temperature. In some embodiments, block 88 may include switching the integrated circuit 38 from an operational mode, such as functioning as an A/D converter, to a sensing mode at block 90. The output of the integrated circuit 38 is read at block 92. Block 88 may also include switching the integrated circuit back to the operational mode at block 94.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

What is claimed is:

1. A drywell comprising:
   a receiver having first and second ends, one of the first and second ends being exposed to ambient air and defining an opening therein for receiving a probe and the other of the first and second ends being relatively more insulated from the ambient air;
   a first heating element in thermal contact with the receiver proximate the first end;
   a second heating element in thermal contact with the receiver proximate the second end;
   a receiver sensor in thermal contact with the receiver proximate the second end, the receiver sensor being the only temperature sensor in thermal contact with the receiver;
   an ambient sensor generating an ambient sensor reading; and
   a controller,
   wherein the first and second heating elements, the receiver sensor, and the ambient sensor are in data communication with the controller, the controller being programmed to monitor a temperature indicated by the receiver sensor, to compare the temperature indicated by the receiver sensor to a set temperature, to calculate a first heater power value according to the comparison, and to calculate a second heater power value according to the ambient sensor reading and the temperature indicated by the receiver sensor, the controller being further programmed to power the first heating element according to the first heater power value and power the second heating element according to the second heater power value.

2. The drywell of claim 1, wherein the controller is programmed to calculate the first and second heater power values effective to reduce a temperature difference between the first and second ends.

3. The drywell of claim 1, wherein the first end is relatively more insulated from the ambient air than the second end and wherein the second end is exposed to the ambient air.

4. The drywell of claim 1, wherein the controller is programmed to calculate the first heater power value by applying a correction factor to the second heater power value, the correction factor corresponding to the ambient temperature reading.

5. The drywell of claim 1, wherein the controller is programmed to multiply the first heater power value by a correction factor to calculate the second heater power value.

6. The drywell of claim 5, wherein the controller is programmed to add the correction factor to the first heater power value to calculate the second heater power value.

* * * * *